Feb. 11, 1930.  E. BROWN  1,746,990
COMPRESSED FLUID MACHINE
Filed Nov. 24, 1926  2 Sheets-Sheet 1

Witness:
R. Burkhardt

Inventor:
Eric Brown,
By Cromwell, Greist & Warden
attys

Feb. 11, 1930. E. BROWN 1,746,990
COMPRESSED FLUID MACHINE
Filed Nov. 24, 1926  2 Sheets-Sheet 2

Witness:
G. Burkhardt.

Inventor:
Eric Brown,
By Cromwell, Greist & Warden
attys

Patented Feb. 11, 1930

1,746,990

UNITED STATES PATENT OFFICE

ERIC BROWN, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

COMPRESSED-FLUID MACHINE

Application filed November 24, 1926, Serial No. 150,406, and in Germany December 7, 1925.

My invention relates to compressed fluid machines and it has particular reference to rotary machines of the foregoing type which handle only a relatively small fraction of the total large pressure range of the operating fluid.

Centrifugal pumps, steam turbines, and similar fluid pressure machines, are very often operated on a relatively small range of the total pressure of the operating fluid so that, from the standpoint of operation, it would be sufficient to design the cooperating elements of the machine only with a view of taking care of the actual pressure drop in the machine unit itself, without regard to the actual pressure of the fluid with respect to the surroundings. Under such circumstances, the machine unit could be made of a relatively light construction and the several parts thereof could be made readily accessible for assembly, repair etc.

In the practical construction of such machines, however, regard must be given to the fact that while the small pressure drop in the machine unit itself would require only relatively light construction, the total pressure of the fluid in the machine unit with respect to the surroundings is much higher, and, accordingly, the walls of the relatively complicated machine unit must be of increased thickness corresponding to the total pressure drop between the fluid in the machine and the surroundings thereof.

The foregoing requirements very often impose serious limitations on the design of such machines, inasmuch as complicated machine parts of exceedingly large thickness have to be provided, which is in itself a very difficult task. Furthermore, should the maximum pressure be so high as to practically preclude the use of longitudinally split casings, it becomes a matter of great difficulty to design the machine so as to permit mounting and access of the rotating members in the interior thereof, and of the bearings and glands of the machine.

These difficulties are of particular weight since the machines of the foregoing type have to be operated at relatively high speeds requiring careful balancing of the rotor or impeller members, which is almost impossible with the type of casing in which longitudinal splits have to be avoided. On the other hand, the machine unit itself, in so far as its operating characteristics are concerned, operates in substantially the same manner whether used at a relatively low pressure point or at a relatively high pressure point of the total pressure range, as long as the total pressure drop in the machine unit itself remains unchanged.

Among the objects of the present invention is the provision of a machine of the foregoing type in which the principal machine elements, such as the impeller, the impeller casing, etc., which operate to create or utilize the fractional pressure drop corresponding to the respective machine unit, may be designed without regard to the total fluid pressure in the machine unit, while at the same time providing an outer housing, which is substantially distinct from the machine unit itself, arranged to so cooperate with the internal elements of the machine unit as to be equivalent to a structure in which the interior elements of the unit have a wall thickness corresponding to the total pressure of the fluid operating therein.

The foregoing and other objects of my invention will be best understood from the accompanying drawings in which, Fig. 1 is a sectional view through a centrifugal pump exemplifying my invention;

My invention is of particular importance in connection with machines of the rotary type, such as centrifugal pumps, compressed gas or vapor turbines, or the like, but in some respects it is of a more general nature. According to my invention I divide the machine unit that is to operate over a relatively small fraction of the total pressure range, but at a high point thereof, into two distinct units.

One of the units, which I may term the interior operating unit, is made so that it represents a complete operating unit adapted to carry on all the functions assigned thereto, if operated at a relatively low pressure point of the total range, without substantially any additional cooperating elements. Accordingly, the walls of said operating unit may be made relatively thin and the housing enclosing the rotor or impeller elements in the interior thereof may be longitudinally split to permit ready access and adjustment of the internal members of the machine. The thin wall construction is also very important inasmuch as it facilitates the manufacture of the relatively complicated internal parts of the machine.

This operating unit, which is in itself not adapted to operate at the high pressure point for which it is intended to be used, is converted into a unit suitable for operation at such high pressure by enclosing said unit in a thick-wall casing designed with a view to withstand the full pressure of the fluid in the interior of the machine.

Since this outer casing is relatively simple in construction it may be made without longitudinal splits to be capable of withstanding the maximum pressures that occur in practice. On the other hand, since the interior operating elements of the machine unit may be assembled and operated separately from the outer casing, the parts thereof may be adjusted and balanced under conditions which are in every respect equivalent to the actual operating conditions of the machine.

Figure 1:
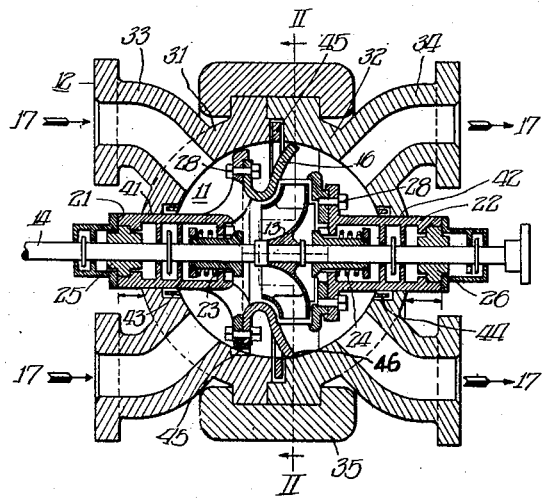
Figure 2:
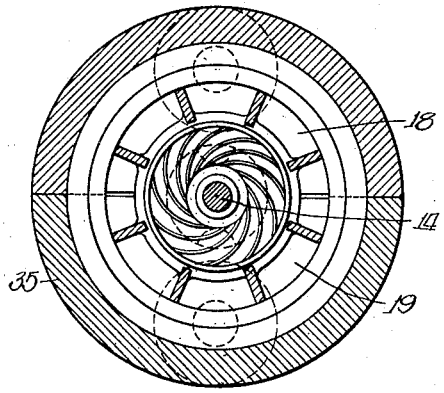
Fig. 2 is a transverse sectional view of the pump shown in Fig. 1 along the line II—II.

In carrying out my invention in the instance of a centrifugal pump, such as shown in Figs. 1 and 2, I provide the same, in general, of two distinct units, the interior, thin-wall pump unit 11, and the outer thick-wall casing unit 12. The pump unit 11 is designed as if it were a substantially independent pump, being in its dimensions suited to the fractional pressure range which it is to handle, practically disregarding the considerations as to the high interior pressure actually existing in the machine with respect to the exterior thereof. To take care of these high pressures, the interior pump unit is so housed in the outer, substantially independent, casing 12, as to prevent distortion and damage to the walls and bearing of the pump unit under actual operation at the high pressures.

In the particular exemplification of the pump shown in Fig. 1, the pump unit may comprise a rotor member or impeller 13 mounted on a shaft 14 and arranged to cooperate with an impeller casing 16 to create a pressure in a liquid or other fluid, so as to circulate the same in the direction of the arrows 17. The total pressure created by the impeller 13 is understood, however, to be only a fraction of the total pressure maintained in the liquid, as would be the case for instance, where the pump unit would constitute the highest stage of a number of serially acting fluid pumps. The impeller casing 16 may be arranged with longitudinal splits in a direction parallel to the shaft, for instance, in the form of two halves 18, 19, so as to permit ready dismantling of one half of the impeller casing and exposure of the internal parts of the impeller 13. Extending from the impeller casing 16, at both ends thereof, are end members 21, 22 containing glands 23, 24 and bearings 25, 26 holding the shaft for rotary movement. The several parts are suitably held together, as by means of bolts 28 to constitute a mechanically complete and operatively independent unit. The shape and thickness of the walls of this unit are designed principally with a view to withstand only the fractional pressure drop that is being dealt within the machine. The pump unit, comprising the rotor 13 with the impeller casing 16 and the extensions thereof 21, 22 with the other cooperating parts thus constitutes a mechanically independent unit that may be run at any time as a pump for creating fractional pressure for which it is designed and also for balancing and adjusting the several parts thereof.

The outer housing 12 which is arranged to surround the interior pump unit 11 so as to convert the same for service at high pressure may consist of two halves 31, 32 having suction and delivery connections 33, 34 to admit and lead away the fluid from the interior pump unit 11. The two halves 31 and 32 of the outer casing may be held together by a clamping ring 35 that is axially divided into two halves. This construction avoids the introduction of longitudinal splits into the walls of the housing 12 and thus permits construction thereof for the highest practically occuring pressures. The end portions 21 and 22 of the interior pump unit are preferably made as integral cylindrical members without axial splits, and are arranged to fit into openings 41, 42 of the outer thick wall housing 12, parts of the end portions projecting outside the casing halves 31 and 32 to permit access to the bearings 25 and 26 from the outside of the completely assembled machine.

In order to prevent leakage of the fluid through the several joints in the outer pressure casing 12, suitable sealing rings 43, 44, 45 are provided of rustless steel, for instance, and arranged to be forced to their seats by the internal pressure of the liquid in a manner familiar in such constructions. Suitable keys, such as indicated at 45', may also be provided to prevent the rotation of the casing of the interior pump unit within the outer thick wall casing. Since the fluid pressure difference between the intake and exit of the pump is relatively small, no extended sealing arrangement or connection between the outer surface of the casing 16 and the internal surface of the outer casing 32 is necessary in order to prevent leakage or by-passing action of the fluid at this point. An ordinary substantially fluid tight fit between the outer surface of the casing 16 and the outer casing walls at a single point 46 between the fluid inlet and outlet openings will in most cases be sufficient, although a more complicated seal may be provided if found necessary. Such fit or connection between the two casings insures that the inner casing will at no portion or part thereof be subject to an exterior pressure less than the fluid inlet pressure or greater than the fluid outlet pressure.

With the foregoing arrangement, the outer high-pressure casing may be readily removed from around the interior pump unit 11 of the machine by removing the clamping ring 35 and then withdrawing the casing halves 31 and 32 from the extensions 21 and 22 on the two sides of the pump unit. The foregoing construction is also very desirable inasmuch as the support between the outer casing and the interior pump unit is restricted to the end portions 21 and 22 of the pump unit so that distortions of the casing on account of high internal pressure will not affect the machine.

The construction described above is also suitable for high pressure sections of steam turbines which utilize only a small part of the total available pressure. In such arrangements the extensions 21 and 22 may be conveniently arranged to house the speed and emergency governor gear.

Figure 3:
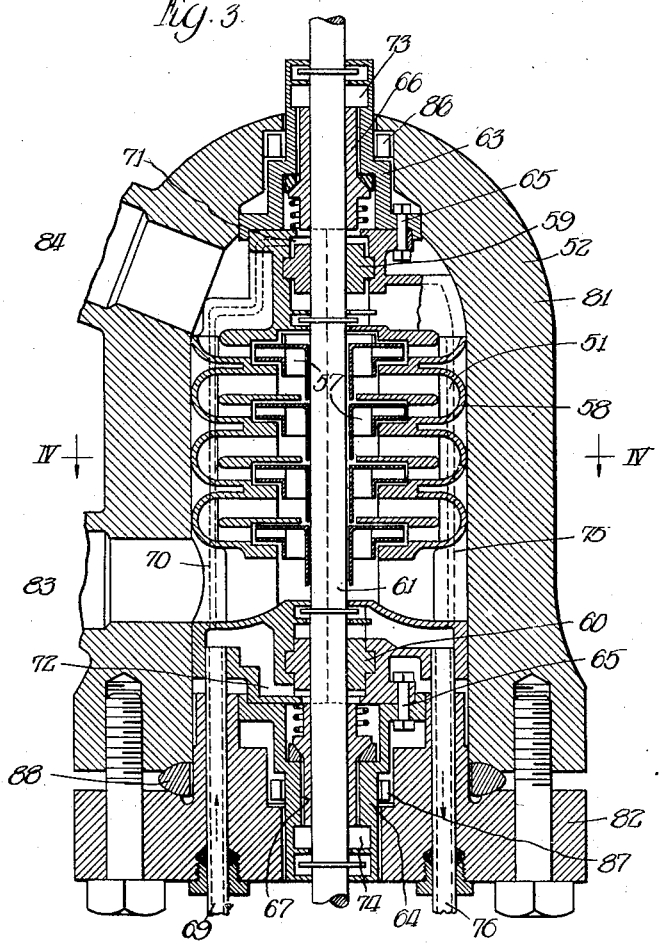
Fig. 3 is a view similar to Fig. 1 showing a multi-stage compressor unit exemplifying my invention.
Figure 4:
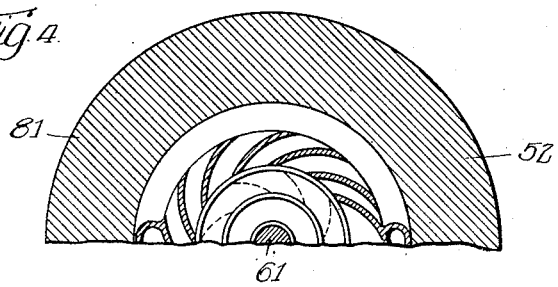
Fig. 4 is a transverse sectional view of the machine shown in Fig. 3 along the line IV—IV.

As is pointed out above, the principles of my invention are not restricted to any particular type of machine, and an example of the application thereof to the construction of a multi-stage gas or vapor circulating pump is shown in Figs. 3 and 4. As in the casing of the pump shown in Figs. 1 and 2, the machine unit comprises a compressor unit 51 arranged to constitute in itself a substantially complete operating unit and an outer thick walled housing 52 for making said compressor unit suitable for operation at high pressures, considerably in excess of the pressure drop in the compressor unit itself. On the other hand, the walls of the interior compressor unit are relatively thin and are designed only for the low pressure drop dealt with therein.

The compressor unit comprises four impellers 57 which are arranged to cooperate with a suitable diffuser casing 58, carrying at its ends bearings 59 and 60 for supporting a shaft 61 on which the impeller members 57 are mounted. As in the casing of the pump shown in Figs. 1 and 2 the diffuser casing 58 has, preferably, one-part extensions 63, 64, which are secured to the diffuser housing by means of bolts 65. The impeller members, with the diffuser housing and the other parts associated therewith thus constitute a self-contained four-stage compressor unit adapted to be operated mechanically independently from the high pressure casing 52.

A distinguishing feature of the arrangement shown in Figs. 3 and 4 is the arrangement for circulating a sealing liquid to glands 66 and 67 adjacent the bearings 59 and 60. The sealing liquid may also be used as a lubricant. The sealing and lubricating liquid may be admitted to the glands through pipes 69, 70 leading into chambers 71, 72 between the bearings and the glands. The sealing liquid is then collected in the chambers 73, 74 and led away through pipes 75 and 76.

The thick walled outer pressure housing for the fractional-pressure interior compressor unit is arranged in the form of a tubular main body portion 81 and a cover 82 designed to withstand the high pressure of the gas. The main body portion 81 of the outer housing 52 may be so provided with the suction and delivery connections 83, 84 respectively, that the cover 82 may be removed without dismantling the high-pressure joints. The auxiliary sealing-liquid pipes 69, 70, 75 and 76 are preferably arranged parallel to the axis of the machine so that the cover may be withdrawn in axial direction without the necessity of previously dismantling the pipe connections inside the casing. The mechanically independent compressor unit is supported in the outer casing 52 at the end extensions 63 and 64 similar to the machine shown in Figs. 1 and 2. The projecting end portions may be sealed by means of special steel rings 86, 87, and a suitable packing ring 88 ground to the shape shown in the drawing may be placed between the cover and the main body portion of the housing to prevent escape of the gas through said joint.

The interior compressor unit may be axially split into two halves, or more parts, so as to permit ready access to the internal members of the machine. On the other hand, the simple construction of the outer housing 52 permits the manufacture thereof in the form of an integral shell without any axial splits so as to be mechanically safe at very high pressures.

My invention is susceptible of many other modifications and I desire that the appended claims be construed broadly to cover all embodiments falling within the true spirit of my invention.

What I claim is:

1. In a pressure-fluid machine system, an impeller unit comprising a shaft, a rotary impeller member mounted on said shaft, a tubular impeller housing surrounding said impeller member, said impeller housing having extensions, bearing members in said extensions for journalling said shaft, said impeller member and housing and the cooperating bearing members constituting in themselves a complete operating unit arranged to operate at relatively low pressure differences between the intake and delivery sides thereof, the walls of said housing being relatively thin and not capable of operating at pressures considerably in excess of said pressure difference, and a tubular casing axially surrounding said impeller housing, said casing being of relatively greater thickness and so cooperating with said housing as to adapt the same for operation at relatively high pressures at which it would in itself become inoperative, said casing being split in a direction transverse to said shaft to permit removal of said impeller unit from the interior thereof, and pipe connections leading from outside of said casing to portions of said impeller unit in the interior of said casing, said pipe connections being so disposed parallel to the shaft that the portion of the casing through which said pipe connections project may be withdrawn from said impeller unit without breaking the connections between said pipe connections and said impeller unit.

2. In a pressure-fluid machine system, an impeller unit comprising a shaft, a rotary impeller member mounted on said shaft, a tubular impeller housing surrounding said impeller member, said impeller housing having extensions, bearing members in said extensions for journalling said shaft, said impeller member and housing and the cooperating bearing members constituting in themselves a complete operating unit arranged to operate at relatively low pressure differences between the intake and delivery sides thereof, the walls of said housing being relatively thin and not capable of operating at pressures considerably in excess of said pressure difference, and a tubular casing axially surrounding said impeller housing, said casing being of relatively greater thickness and so cooperating with said housing as to adapt the same for operation at relatively high pressures at which it would in itself become inoperative, said casing being split in a direction transverse to said shaft to permit removal of said impeller unit from the interior thereof.

3. In fluid-pressure apparatus, an operating shaft, a fluid-impelling element disposed on said shaft for rotation therewith, a plurality of complementary casing parts having certain of their respective edge portions disposed in substantially parallel relation to said shaft and secured together to provide a casing for said element having fluid inlet and outlet openings, and a plurality of complementary casing parts having certain of their respective edge portions disposed substantially normal to said shaft and secured together to provide an outer casing disposed about said first-named inner casing and having fluid inlet and outlet openings communicating respectively with said first-named fluid inlet and outlet openings, said inner casing having intermediate its fluid inlet and outlet openings a substantially fluid-tight connection with said outer casing and being provided on opposite sides with portions extending outwardly into adjacent wall portions of said outer casing and providing a support for said inner casing.

In testimony whereof I have hereunto subscribed my name, at Zurich, Switzerland this 4th day of November, 1926.

ERIC BROWN.